INVENTOR
David Horace Chandler
BY
Baldwin Wight Diller & Brown
ATTORNEYS

United States Patent Office 3,523,293
Patented Aug. 4, 1970

3,523,293
RADAR DISPLAY CORRECTING ARRANGEMENTS
David Horace Chandler, Essex, England, assignor to The Marconi Company Limited, London, England, a British company
Filed July 11, 1968, Ser. No. 744,151
Claims priority, application Great Britain, July 12, 1967, 32,122/67
Int. Cl. G01s 9/02
U.S. Cl. 343—5     13 Claims

ABSTRACT OF THE DISCLOSURE

In a radar having fixed deflection coil display apparatus and using a resolver to produce voltages proportional to the sine and cosine of the bearing angle $\theta$ of a target to be displayed, the squint angle $\delta$ is corrected by combining voltages proportional to $+\sin \theta$ and $+\cos \theta$ with preselected combined proportions of these circular functions to produce a voltage proportional to one of $-\sin (\theta+\delta)$, $-\sin (\theta-\delta)$, $-\cos (\theta+\delta)$ and $-\cos (\theta-\delta)$.

---

This invention relates to radar display correcting arrangements and has for its object to provide improved arrangements for correcting a radar display—or more precisely, for correcting the signals which are to be fed to a radar display apparatus—so as substantially to compensate for so-called "squint" in the aerial system employed in the radar. More particularly the invention provides improved radar display correcting arrangements for radars of the kind in which the display apparatus is of the fixed deflection coil type and a resolver is employed to produce voltages proportional to the sine and cosine of the bearing angle $\theta$ of a target to be displayed. Radars of this kind are, of course, well known. As will be seen later the invention provides improved arrangements for producing from the voltages $\sin \theta$ and $\cos \theta$ voltages $\sin (\theta \pm \delta)$ and $\cos (\theta \pm \delta)$ respectively, for use as the deflection voltages of the display, $\delta$ being readily adjustable so that it can be made equal to the squint angle of the radar aerial system.

Figure 1:
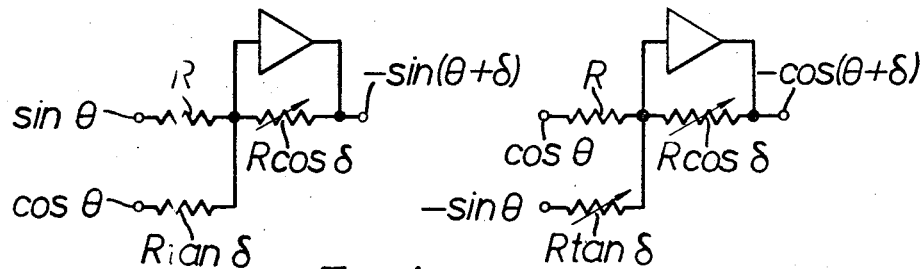
Figure 2:
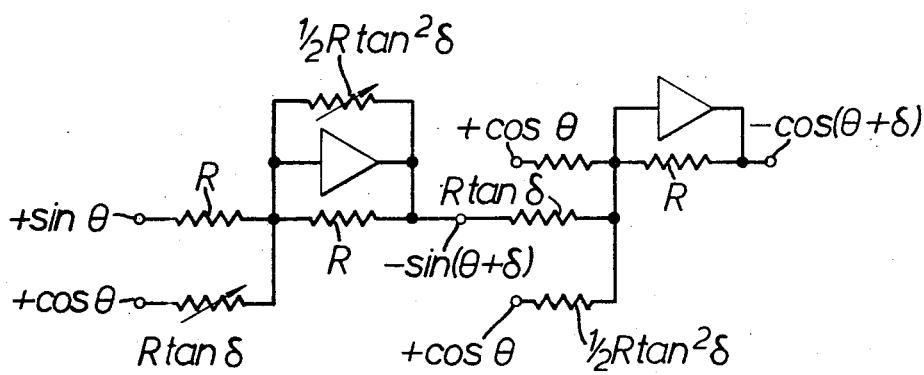
Figure 3:
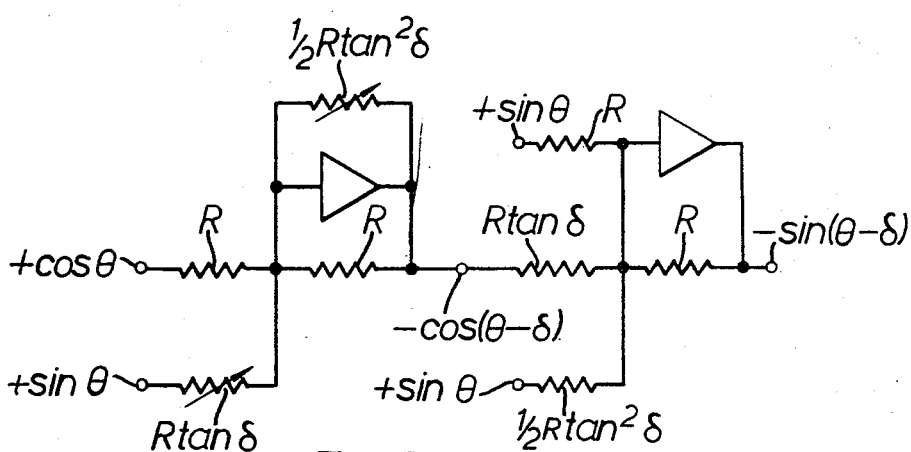
Figure 4:
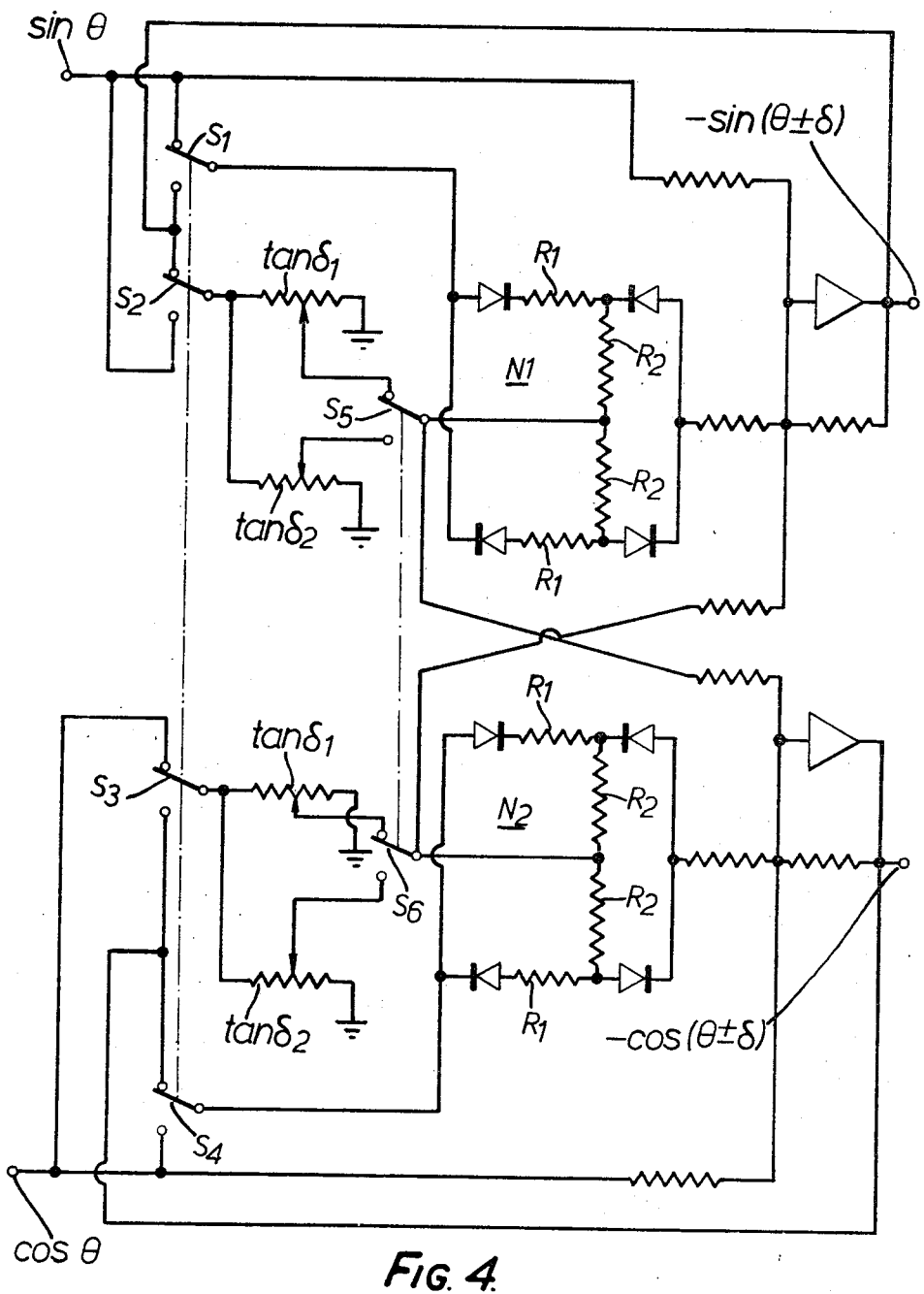

In the drawings:
FIG. 1 is a diagram of a prior art squint correcting circuit;
FIGS. 2 and 3 are diagrams of circuits for correcting for positive and negative squint respectively; and
FIG. 4 is a diagram of a circuit which may be used to correct for either positive or negative squint.

In order that the invention may be the better understood there will first be described, and illustrated in FIG. 1 of the accompanying drawings the method usually adopted at the present time to correct for squint in a radar of the kind referred to. Referring to FIG. 1, which, it is thought, is largely self-explanatory, it will be seen that what is done is to combine sine $\theta$ and cos $\theta$ to produce $$-(\sin \theta \pm \cos \theta \tan \delta)$$

and $$-(\cos \theta \mp \sin \theta \tan \delta)$$

and then to reduce the amplitudes of these voltages by a factor $\cos \delta$. This correcting arrangement can be described by the equations:

$$\cos \delta (\sin \theta \pm \theta \tan \delta) = \sin (\theta \pm \delta)$$

$$\cos \delta (\cos \theta \mp \sin \theta \tan \delta) = \cos (\theta \pm \delta)$$

The main defect of this known correcting arrangement is that if the scale of the display is to be maintained unchanged when adjusting for different values of squint angle $\delta$, controls for adjusting both $\tan \delta$ and $\cos \theta$ must be provided. It also has the defect of requiring the provision of inverted signals (i.e. $-\cos \theta$ and $-\sin \theta$). It is also inconvenient for use in those case where it is required to be able to switch by remote control from one pre-set predetermined value of $\delta$ to another, e.g. when changing over from one radar aerial to another (e.g. a "stand by" aerial), for in such a case there must be two complete squint correction arrangements (one pre-set to suit one aerial and the other pre-set to suit the other) and switching over effected at their outputs.

The present invention seeks to avoid these defects.

According to this invention a radar of the kind referred to comprises, for correcting for the squint angle ($\delta$) of the radar aerial system an adjustable correcting arrangement including means for combining voltages proportional to $+\sin \theta$ and $+\cos \theta$ with pre-determined selected combined proportions thereof to produce a voltage substantially proportional to $-\sin (\theta \pm \delta)$ or to $-\cos (\theta \pm \delta)$ where $\theta$ is the bearing angle of a radar target and $\delta$ is the squint angle to be corrected.

In one way of carrying out the invention the voltages proportional to $+\sin \theta$ and $+\cos \theta$ are applied to a combining circuit consisting of two portions one of which includes an amplifier with such feedback that said portion provides an output voltage substantially proportional to either $-\sin (\theta+\delta)$ or $-\cos (\theta-\delta)$ and the other of which combines voltages proportional to $+\sin \theta$ or $+\cos \theta$ with output voltage from the first.

One of the pre-determined selected combined proportions may be $\sin \theta$ and the output from a $\tan \delta$ potentiometer (or its equivalent) fed with $\cos \theta$ or it may be $\cos \theta$ and the output from a tan potentiometer (or its equivalent) fed with $\sin \theta$, depending on the sign of the squint angle to be corrected.

Another of the pre-determined selected combined proportions may be derived by means of a potentiometer (or its equivalent) approximating to a ½ $\tan^2 \delta$ potentiometer. Slightly better accuracy can be obtained, if desired, by substituting, for the ½ $\tan^2 \delta$ potentiometer, a $$\left(\frac{1^2}{2}+\frac{5}{24}\delta^4\right)$$

potentiometer. Preferably, however, a $\tan \delta$ potentiometer (or its equivalent) is employed in conjunction with a combining network so dimensioned as to approximate a square law function by providing zero output over a pre-determined range of low value squint angles and a substantially linear output over the remainder of the range of squint angles to be corrected, the whole arrangement being such that the combination of ten potentiometer and network produces a scaling factor approximating to ½ $\tan^2 \delta$.

Where positive squint angles are to be corrected the preferred arrangement is one in which $-\sin (\theta+\delta)$ is produced by combining three components as follows:

$\sin \theta + \tan \delta \cos \theta - ½ \tan^2 \delta \sin (\theta+\delta)$ and $-\cos (\theta-\delta)$ is produced by combining three components as follows:

$$\cos \theta - \tan \delta \sin (\theta+\delta) + ½ \tan^2 \delta \cos \theta$$

Where negative squint angles are to be corrected the preferred arrangement is one in which $- \sin (\theta-\delta)$ is produced by combining three components as follows:

$\sin \theta - \tan \delta(\cos \theta - \delta) + ½ \tan^2 \delta \sin \theta$ and $-\cos (\theta-\delta)$ is produced by combining three components as follows:

$$\cos \theta + \tan \delta \sin \theta - ½ \tan^2 \delta \cos (\theta-\delta)$$

According to a feature of this invention a radar of the kind referred to comprises for correcting for the squint angle of the radar aerial system an adjustable correcting arrangement including first and second networks each dimensioned to introduce an approximation to a $\tan^2 \delta$ factor; means for applying a $\sin \theta$ voltage to the first network and a $\tan \delta \cos \theta$ voltage to the second; means for combining the $\sin \theta$ voltage with the output from said first network and the input to said second; means for also applying to said first network a tan proportion of a $-\sin(\theta+\delta)$ voltage derived from the resultant of said combination; means for combining the $\cos\theta$ voltage with the output from said second network and with the said tan $\delta$ proportion of the $-\sin(\theta+\delta)$ voltage; and means for also applying to said second network a $-\cos(\theta+\delta)$ voltage derived from the resultant of the last mentioned combination.

According to another feature of this invention a radar of the kind referred to comprises for correcting for the squint angle of the radar aerial system an adjustable correcting arrangement including first and second networks each dimensioned to introduce an approximation to a $\tan^2\delta$ factor; means for applying a $\cos\theta$ voltage to the second network and a tan $\delta\sin\theta$ voltage to the first; means for combining the $\cos\theta$ voltage with the output from the second network and the input to the first; means for also applying to the second network a tan $\delta$ proportion of a $-\cos(\theta-\delta)$ voltage derived from the resultant of said combination; means for combining the $\sin\theta$ voltage with the output from said first network and with the said tan $\delta$ proportion of the $-\cos(\theta-\delta)$ voltage; and means for applying the said first network a $-\sin(\theta-\delta)$ voltage derived from the resultant of the last mentioned combination.

Preferably the radar comprises adjustable correcting arrangements in accordance with each of the above mentioned features of invention and ganged switches are provided to enable the apparatus to comply with either of said features at will.

FIGS. 2 and 3 of the accompanying drawings and which, regarded simply as circuits, are alike, show one way of carrying out the invention, FIG. 2 being for the case in which the squint angle to be corrected is of positive sign $(+\delta)$ and FIG. 3 being for the case in which the squint angle is negative $(-\delta)$. In both figures the inputs from the resolver (not shown) are $+\sin\theta$ and $+\cos\theta$. There is thus the incidental advantage that inverted signals $(-\sin\theta$ or $-\cos\theta)$ do not have first to be generated. As will be seen inverted outputs $-\cos(\theta\pm\delta)$ and $-\sin(\theta\pm\delta)$ are produced by combinations of $\sin\theta$; $\cos\theta$; $-\sin(\theta\pm\delta)$; and $-\cos(\theta\pm\delta)$ and, in both figures, three input signals are so combined that the scale of the display remains constant despite changes in the value of $\delta$ to be compensated. In effect what is done is to combine the readily available components $\sin\theta$; $\cos\theta$; $-\sin(\theta\pm\delta)$; and $-\cos(\theta\pm\delta)$ to produce a first approximation to the correct required result and then to correct this approximation to a second order of accuracy by adding or subtracting a correcting function $(\frac{1}{2}R\tan^2\delta)$ which is also readily available in the circuit. It may be shown that the final correction obtained is accurate to so close a degree that, in practice, the remaining inaccuracy is small. For squint angles up to 7° the remaining error factor (this may be shown to be $\frac{1}{8}\delta^4$) is practically negligible.

In FIGS. 2 and 3 the method of combining the components is shown, for simplicity of drawing, as by means of the three resistances marked R, R tan $\delta$ and $\frac{1}{2}R\tan^2\delta$. In practice the proportions tan $\delta$ and $\frac{1}{2}\tan^2\delta$ would normally be derived by potentiometers.

In practice it is convenient to calibrate the resistances or potentiometers providing the scaling factors tan $\delta$ and $\frac{1}{2}\tan^2\delta$ in degrees and minutes of squint angle. $\delta$ and the said resistances or potentiometers may be constituted each by a plurality of resistance elements of different values which can be selected for connection in circuit by suitable multi-position rotary switches which may, if desired, be remotely controlled.

A preferred embodiment is shown in FIG. 4. For the moment, and in order to simplify description assume that the switches S1 to S6 are not provided and that the circuit is such as would be established with said switches in the "up" positions. On this assumption FIG. 4 will correct for a positive squint angle $\delta_1$ though (as will be seen later), the switches allow for correction of positive and negative squint angles $\pm\delta_1$ and $\pm\delta_2$ as may be required. In the embodiment of FIG. 4 the scaling factors $\frac{1}{2}\tan^2\delta$ are produced by means of networks N1 and N2 a function generator which take signals from the tan $\delta_1$ potentiometers so marked. The inputs to the networks N1 and N2 include respectively a $\sin\theta$ input from the terminal so marked and a selected proportion of a $\cos\theta$ input fed from the terminal so marked and selected by the lower of the two tan $\delta_1$ potentiometers so marked. The input to the network N2 is combined with the output from the network N1 and with the $\sin\theta$ signals are combined and fed as a second input to the network N1. Similarly the input to the network N1 is combined with the output from the network N2 and with the $\cos\theta$ signals and fed as a second input to the network N2. As will be appreciated the second inputs to the networks N1 and N2 will be respectively $-\sin(\theta+\delta)$ and $-\cos(\theta+\delta)$. Each of the networks is designed and dimensioned as to provide an output current which is an acceptably close approximation to the function $R\tan^2\delta_1$ this dimensioning being such that each network provides a zero output for squint angles within a small initial range—say from 0° to 2½°—and a linearly varying output over the rest of the range—say from 2½° to 7°. This is achieved by suitable selection in each network of the ratio of $R_2$ to $R_1$ which is so chosen as to produce (assuming the figures just given) at the junction points of $R_1$ with $R_2$, a zero signal during the appropriate 180° of azimuth rotation if the tan $\delta_1$ potentiometers are adjusted to positions corresponding to a squint angle between 0° to 2½°. If the said potentiometers are adjusted to correspond with a squint angle of between 2½° and 7° one or other of the two diodes on the output side of the network will remain cut off during 180° of rotation and the current through the other output diode will supply the appropriate output signal from the signal fed to the appropriate tan $\delta_1$ potentiometer.

It may be remarked that the magnitude of the $\frac{1}{2}\tan^2\delta$ contribution to the output waveform is only about 1 part in 128 at a squint angle of 7° and errors in this contribution, if not too large—say say below about 10%—are not of practical importance. The method employed in FIG. 4 of employing two straight line functions to provide an approximation to a square law function and the treatment of functions of $\theta\pm\delta$ and functions of $\delta$ as though they were the same in practice introduce errors of less than 1 part in 1000 in the output waveform.

It will now be self-evident from FIG. 4 that the provision of the change over switches (which may be remotely controlled) with their associated circuitry enables the equipment to deal at will with either positive or negative squint angles and either of two values $\delta_1$, $\delta_2$ of such angles. Change over of the four ganged switches $S_1$ to $S_4$ changes over from positive to negative squint angles or vice versa. Change over of the two further ganged switches $S_5$ and $S_6$ changes over from one giving correction for one pre-set value $\delta_1$ of squint angle to another pre-set value $\delta_2$ of squint angle and vice versa. This provision is useful in many cases, for example where there is a main radar with a squint angle of one value $(\delta_1)$ and a stand-by radar with a different squint angle $(\delta_2)$. The switch selected potentiometers for $\delta_1$ and $\delta_2$ are indicated in FIG. 4 by the references tan $\delta_1$, and tan $\delta_2$.

It will be seen that apparatus in accordance with this invention exhibits the advantages that it does not involve the generation of the extra signals $-\sin\theta$ and $-\cos\theta$; it provides the whole information to correct for a particular squint angle $\delta$ by adjustment of a tan $\delta$ potentiometer, or its equivalent, without any need for a $\cos\delta$ potentiometer; it is applicable to the correction of squint angles of either sign; it is most conveniently applicable to radar installations wherein there is a main radar and a standby radar with aerials of different squint angles, for which application there can be good sharing of circuitry (see FIG. 4) with consequent economy of apparatus; and, perhaps, most importantly, it enables potentiometers (or their equivalents) which can be calibrated directly in squint angles, to be used as adjustment devices and, when so used, to effect adjustment to correct for different squint angles without disturbing the scale of the display.

I claim:

1. A radar of the kind in which the display apparatus is of the fixed deflection coil type and a resolver is employed to produce voltages proportional to the sine and cosine of the bearing angle of a target to be displayed said radar including for correcting for the squint angle of the radar aerial system an adjustable correcting arrangement including first and second networks each dimensioned to introduce an approximation to a $\tan^2 \delta$ factor; means for applying a $\sin \theta$ voltage to the first network and a $\tan \delta \cos \theta$ voltage to the second; means for combining the $\sin \theta$ voltage with the output from said first network and the input to said second; means for also applying to said first network a $\tan \delta$ proportion of a $-\sin(\theta+\delta)$ voltage derived from the resultant of said combination; means for combining the $\cos \theta$ voltage with the output from said second network and with the said $\tan \delta$ proportion of the $-\sin(\theta+\delta)$ voltage; and means for also applying to said second network a $-\cos(\theta+\delta)$ voltage derived from the resultant of the last mentioned combination.

2. A radar including squint angle correction means as set forth in claim 1 and ganged switch means adapted to bring into operation either of the said squint angle correction means at will.

3. A radar of the kind in which the display apparatus is of the fixed deflection coil type and a resolver is employed to produce voltages proportional to the sine and cosine of the bearing angle of a target to be displayed including for correcting for the squint angle of the Radar aerial system and adjustable correcting arrangement including first and second networks each dimensioned to introduce an approximation tho a $\tan^2 \delta$ factor; means for applying a $\cos \theta$ voltage to the second network and a $\tan \delta \sin \theta$ voltage to the first; means for combining the $\cos \theta$ voltage with the output from the second network and the input to the first; means for also applying to the second network a $\tan \delta$ proportion of a $-\cos(\theta-\delta)$ voltage derived from the resultant of said combination; means for combining the $\sin \theta$ voltage with the output from said first network and with the said $\tan \delta$ proportion of the $-\cos(\theta-\delta)$ voltage; and means for applying to the said first network a $-\sin(\theta-\delta)$ voltage derived from the resultant of the last mentioned combination.

4. A radar including squint angle correction means as set forth in claim 3 and ganged switch means adapted to bring into operation either of the said squint angle correction means at will.

5. In a radar apparatus of the kind having an aerial system, a display device of the fixed deflection type, a resolver for producing voltages proportional to the sine and cosine of the bearing angle of a target to be displayed and means for correcting for squint angle, an adjustable correction circuit comprising means for coupling voltages proportional to $+\sin \theta$ and $+\cos \theta$ to a first operational means, said first operational means producing a first output voltage proportional to eiter $-\sin(\theta + \delta)$ or $-\cos(\theta-\delta)$, means for coupling voltages proportional to either $+\cos \theta$ or $+\sin \theta$ respectively, and said first output voltage to a second operational means, said second operational means producing a second output voltage proportional to either $-\cos(\theta+\delta)$ or $-\sin(\theta-\delta)$, respectively, $\theta$ being the bearing angle and $\delta$ being the squint angle.

6. The apparatus as claimed in claim 5 wherein said first operational means comprises a first amplifier having at least one feedback path including a path providing a $\frac{1}{2} \tan^2 \delta$ function.

7. The apparatus as claimed in claim 5 wherein the voltage proportional to $+\sin \theta$ is fed to said first operational means via a first resistance having a given value, and the voltage proportional to $+\cos \theta$ is fed to said first operational means via a second resistance having the value $R \tan \delta$ where R is the value of said first resistance.

8. The apparatus as calimed in claim 5 wherein the voltage proportional to $+\cos \theta$ is fed to said first operational means via a first resistance having a given value, and the voltage proportional to $+\sin \theta$ is fed to said first operational means via a second resistance having the value $R \tan \theta$ where R is the value of said first resistance.

9. The apparatsu as claimed in claim 5 wherein either the voltage proportional to $+\cos \theta$ or the voltage proportional to a $+\sin \theta$ respectively is fed to said first operational amplifier via a $\tan \delta$ potentiometer or its equivalent.

10. The apparatus as claimed in claim 5 wherein either a voltage proportional to $\cos \theta$ and a voltage proportional to $\cos \theta$ fed via a substantially $\frac{1}{2} \tan^2 \delta$ potentiometer or its equivalent, or a voltage proportional to $+\sin \theta$ and a voltage proportional to a $+\sin \theta$ fed via a $\frac{1}{2} \delta$ potentiometer or its equivalent are fed to said second operational means.

11. The apparatus as claimed in claim 9 wherein either a voltage proportional to $\cos \theta$ and a voltage proportional to $\cos \theta$ fed via a substantially $\frac{1}{2} \tan^2 \delta$ potentiometer or its equivalent, or a voltage proportional to $+\sin \theta$ and a voltage proportional to $+\sin \theta$ fed via a $\frac{1}{2} \tan^2 \delta$ potentiometer or its equivalent are fed to said second operational means.

12. The apparatus as calimed in claim 10 wherein said $\frac{1}{2} \tan^2 \delta$ potentiometer is substantially a $$\frac{1}{2} \delta^2 + \frac{5}{24} \delta^4$$

potentiometer or its equivalent.

13. A radar of the kind of which the display apparatus is of the fixed deflection type comprising a resolver for producing voltages proportional to the sine and cosine of the bearing angle of a target to be displayed and means for correcting for the squint angle of the radar aerial system, including an adjustable correcting arrangement having operational means for combining voltages proportional to $+\sin \theta$ and $+\cos \theta$ with pre-determined selected combined proportions thereof to produce voltages substantially proportional to $-\sin(\theta \pm \delta)$ where $\theta$ is the bearing angle of a radar target and $\delta$ is the squint angle to be corrected.

References Cited

UNITED STATES PATENTS 2,730,710    1/1956    Loeb.
3,165,746    1/1965    Whitnah _____ 343—113

RICHARD A. FARLEY, Primary Examiner

U.S. Cl. X.R.

343—16